(12) United States Patent
Bruno

(10) Patent No.: US 11,151,625 B2
(45) Date of Patent: Oct. 19, 2021

(54) GEOGRAPHICAL MERCHANT CONSORTIUM COMMERCE SYSTEM FOR CONTEXTUAL COMMERCE

(71) Applicant: John Bruno, Scottsdale, AZ (US)

(72) Inventor: John Bruno, Scottsdale, AZ (US)

( * ) Notice: Subject to any disclaimer, the term of this patent is extended or adjusted under 35 U.S.C. 154(b) by 127 days.

(21) Appl. No.: 16/520,302

(22) Filed: Jul. 23, 2019

(65) Prior Publication Data
US 2020/0034901 A1 Jan. 30, 2020

Related U.S. Application Data

(60) Provisional application No. 62/702,797, filed on Jul. 24, 2018.

(51) Int. Cl.
G06Q 30/02 (2012.01)
G06Q 30/06 (2012.01)

(52) U.S. Cl.
CPC ..... *G06Q 30/0609* (2013.01); *G06Q 30/0226* (2013.01); *G06Q 30/0605* (2013.01); *G06Q 30/0631* (2013.01)

(58) Field of Classification Search
None
See application file for complete search history.

(56) References Cited

U.S. PATENT DOCUMENTS

| 9,710,839 | B2 | 7/2017 | Pellow et al. |
| 9,998,906 | B2 | 6/2018 | Moldavsky |
| 10,157,415 | B2 | 12/2018 | Perks et al. |
| 2002/0178013 | A1 | 11/2002 | Hoffman et al. |
| 2003/0018522 | A1 | 1/2003 | Denimarck et al. |

(Continued)

FOREIGN PATENT DOCUMENTS

WO 2018104834 A1 6/2018

OTHER PUBLICATIONS

I. Andrew Gazdecki, "How to Make Geofencing Work for Your Small Business", available on Mar. 18, 2014, retrieved from https://www.biznessapps.com/blog/how-to-make-geofencing-work-for-your-small-business/ (Year: 2014).*

(Continued)

*Primary Examiner* — Sam Refai
(74) *Attorney, Agent, or Firm* — Invention to Patent Services; Alex Hobson

(57) ABSTRACT

A geographical merchant consortium commerce system provides contextual offers to subscribed customers to encourage shopping locally. The system includes a plurality of merchants that operate a business within a geographical region, such as within a mall or town. A customer subscribes to the system and provides contextual data such as demographic data, a shopping list and specific personal dates, such as wedding anniversary, or birthday. The system also conducts analysis of internet activity to determine smart needs of the customer. The system then provides contextual offers to the subscribed customer for products based on the contextual data. These offers may be a combined contextual offer, having two or more products from two or more of the plurality of merchants. In addition, a contextual offer may be a proximity contextual offer that is provided to the subscribed customer when they move close to the geographical region of the plurality of merchants.

35 Claims, 13 Drawing Sheets

(56) References Cited

U.S. PATENT DOCUMENTS

| | | |
|---|---|---|
| 2006/0059049 A1 | 3/2006 | Morris et al. |
| 2008/0015938 A1* | 1/2008 | Haddad .............. G06Q 30/0268 |
| | | 705/14.38 |
| 2009/0271264 A1* | 10/2009 | Regmi ................ G06Q 30/0215 |
| | | 705/14.23 |
| 2009/0276305 A1 | 11/2009 | Clopp |
| 2010/0030624 A1 | 2/2010 | Vanska et al. |
| 2010/0082455 A1 | 4/2010 | Rosenblatt et al. |
| 2013/0054351 A1 | 2/2013 | Krugman et al. |
| 2013/0091032 A1 | 4/2013 | Prokop et al. |
| 2013/0110639 A1* | 5/2013 | So .......................... G06Q 30/02 |
| | | 705/14.66 |
| 2013/0166386 A1* | 6/2013 | Simmons ........... G06Q 30/0261 |
| | | 705/14.58 |
| 2013/0275198 A1* | 10/2013 | Zeto, III ............ G06Q 30/0267 |
| | | 705/14.26 |
| 2013/0332274 A1* | 12/2013 | Faith .................. G06Q 30/0225 |
| | | 705/14.53 |
| 2014/0032283 A1 | 1/2014 | Bradford |
| 2014/0095276 A1 | 4/2014 | Suteliffe |
| 2014/0149193 A1* | 5/2014 | DeLuca ................. G06Q 30/06 |
| | | 705/14.5 |
| 2014/0278970 A1 | 9/2014 | Calman et al. |
| 2014/0278999 A1* | 9/2014 | Calman .............. G06Q 30/0259 |
| | | 705/14.57 |
| 2014/0304075 A1 | 10/2014 | Dillingham et al. |
| 2016/0042315 A1 | 2/2016 | Field-Darragh et al. |
| 2016/0189257 A1 | 6/2016 | Dicker et al. |
| 2018/0104834 A1 | 6/2018 | Rathod |
| 2018/0181966 A1 | 6/2018 | Rao et al. |
| 2018/0284453 A1 | 10/2018 | Irvin et al. |

OTHER PUBLICATIONS

International Search Report, Lee W. Young, PCT/US19/43127, dated Nov. 8, 2019.
Written Opinion of the International Search Authority, Lee W. Young, PCT/US19/43127, dated Nov. 8, 2019.
International Preliminary Report on Patentability, (Chapter II of the Patent Cooperation Treaty), Sam Fefai, PCT/US19/43127, dated Oct. 22, 2020.
Chapter II Request and Demand, Alex Hobson, Feb. 4, 2020.

* cited by examiner

GEOGRAPHICAL MERCHANT CONSORTIUM COMMERCE SYSTEM FOR CONTEXTUAL COMMERCE

CROSS REFERENCE TO RELATED

This application claims the benefit of priority to U.S. provisional patent application No. 62/702,797, filed on Jul. 24, 2018, the entirety of which is hereby incorporated by reference herein.

BACKGROUND OF THE INVENTION

Field of the Invention

The invention relates to a geographical merchant consortium commerce system that provides contextual offers to subscribed customers.

Background

Consumers are faced with challenges of finding the products and services they need locally and online. In the local community context, consumers are often having to travel to a physical store, be offered a poor selection of goods, and not have access to relevant information that would otherwise inform a good purchase decision. Store personnel are there to help however the customer may not be aware of what exists beyond the confines of the store let alone what would actually work best for their personal situation. Also, it may be difficult to determine which stores would be appropriate while at a particular location given the propensity to become distracted and lose sight of all that is needed.

In the online internet context, consumers do not have the benefit of experiential access to the product so they can touch and feel what they would be getting vs. the online description. Consumers sometimes find chat and phone available online, however wait times and levels of expertise varies greatly due to the nature of servicing a wider audience and the volumes that go with it. A high percentage of orders end up being returned as expectations disappoint, and many are left unreturned because the economics are not worth spending the time, effort and cost on the return. Also, shipping delays are a recurring problem e.g. the free-2-day-shipping doesn't materialize, necessitating chats with customer service and resulting in delivery several days later if at all.

Local merchants are faced with challenges of reduced demand due to consumers making convenient online purchases. Local merchants cannot afford to stock the latest and greatest items in all configurations which may be available online across a diverse set of merchants. As such, they cannot compete on selection. Local merchants also have a higher expense base given the physical location and need to staff sales reps leaving them unable to compete on price. Value in terms of authenticity, trust, purchase experience, expertise and customer service become differentiating characteristics of local merchants.

Over time, local merchants may end up moving away from providing commodity-like products and more towards niche one of a kind items that cannot be readily discovered online, and towards services. Sales volume would thereby be reduced, along with city tax revenue, a greater proportion of which moves outside the local economy. Local merchants may end up disappearing in neighborhoods along with personal livelihoods of local entrepreneurs—and as such everyone in the city would end up paying a price of higher taxes to support the lost revenues.

Shopping at locally owned businesses yields many benefits including a sampling below:

1. Expertise: Consumers get the right thing and save time by relying on the expertise of local merchants to find the perfect sneaker, best tool for the job, right way to do something, etc. Studies have shown a consumer is 3 times more likely to discover something new at a local store. Despite this, consumer "showrooming" i.e. finding something in a local store then purchasing online, is a major problem for local retailers.

2. Community: Shopping locally means bumping into friends, enjoying lively streets, playing in the toy store, neighborhood conversations, etc. In communities with more local businesses, people have stronger social ties and participate more in civic affairs.

3. Local Economy: Local retailers hire local people, pay local taxes and source goods locally thereby strengthening and expanding the community. Studies have shown that compared to Amazon, independent retailers create twice as many jobs for the same amount of revenue. Additionally, studies have shown that between 68% and 73% of the money spent at local businesses stays in the community vs 43% for non-local businesses.

4. Entrepreneurship: Supporting local retailers provides a path to the middle class for entrepreneurs. Studies have shown that communities with more small businesses have less income inequality.

Consumers need a better way to make informed decisions and find what they need, while combining the best attributes of online and offline capabilities, and supporting local merchants. Consumers could benefit from an advanced system that harnesses the power of local merchants working on their behalf in an efficient and impactful way to reduce disappointing efforts associated with manual searches, researching, misinformation, travelling to stores, and so on.

SUMMARY OF THE INVENTION

The invention is directed to a geographical merchant consortium commerce system that provides contextual offers to subscribed customers, such as an offer price or discounted price for a product or a plurality of products. An exemplary geographical merchant consortium commerce system includes a plurality of merchants that operate a business within a geographical region, such as having a physical store located within a mall or town and the like. A customer can subscribe to the geographical merchant consortium commerce system through a customer subscription feature using a user interface to become a subscribed customer. A customer may provide contextual data to the operating system and this contextual data may be stored in a database. The geographical merchant consortium commerce system may then provide contextual offers to the subscribed customer for products based on the contextual data. These offers may be a combined contextual offer, having two or more products from two or more of the plurality of merchants. In addition, a contextual offer may be a proximity contextual offer that is provided to the subscribed customer when they move close to the geographical region of the plurality of merchants, such as within a proximity distance or within a proximity region. The geographical merchant consortium commerce system provides incentives for the subscribed customer to shop locally by providing combined and proximity offers, for example. This may encourage customers to frequent and do business with merchants that are part of the geographical merchant consortium commerce system and which may be local to the customers location, workplace or home.

An exemplary geographical merchant consortium commerce system incorporates a plurality of merchants, such as two or more, three or more, ten or more, twenty or more and any range between and including the number of merchants provided. The plurality of merchants operate a business, such as a physical store within a geographical region, such as within a physical structure such as a mall or strip-mall, within a shopping district, town, zip code, beauty mall, salon suite, farmer's market, pop-up market, or within a radius of about 0.4 km, about 0.6 km, about 1.0 km, about 15 km, about 3 km and any range between and including the distances provided. In an exemplary embodiment, the geographical region is defined by the area, or smallest area that encompass a store location of each of the plurality of merchants. The plurality of merchants may also define the geographical region and this region may change as business needs change. Some or all of the plurality of merchants my operate a physical store that provides products and/or services or may have a fulfillment center for customers to pick-up products. Still, some merchants may operate their business using mobile stores, such as food trucks, pet grooming services, entertainment services and the like. The geographical region may vary with the location of the mobile stores, and the operating system may use geolocation to track the location of these mobile stores. In addition, the customer may define the geographical region to include an area that they frequent, that is close to their home or work place or an area that includes a common travel path, for example.

The plurality of merchants may provide a wide variety of products including services. A product, as used herein, refers to any product or service offered by a merchant and includes physical products such as consumer staples, vehicles, clothing, groceries and the like, and services including, but not limited to, haircuts, facials, nails, massage, health services like chiropractic adjustment, dental cleaning and the like, entertainment services such as a theater. Note that some of the products may be provided by mobile stores, such as food truck, popup stores or entertainment services. Some of the plurality of merchants may be chains, having multiple store locations within a town, city, state or country. These merchants may participate in a plurality of defined geographical regions determined by the operating system.

An exemplary geographical merchant consortium commerce system is operated by an operating system having a user interface for both the merchants and the customers. A user interlace is any suitable interface for a computing device such as a computer or mobile computing device including a tablet computer or mobile telephone. A user interface may be a keyboard, a touch screen, voice input and the like. The merchants and subscribed customers may input information that is stored in a database and used for contextual offers.

When a customer uses the customer subscription feature to subscribe to the geographical merchant consortium commerce system, they may provide contextual data, such as demographic contextual data. Demographic contextual data is information about groups of people according to certain attributes such as age, gender, place of residence, marital status, number of children, educational level, type of education, income, interests, and can include socio-economic factors such as occupation, family status, organizations belonged to, or income. An exemplary geographical merchant consortium commerce system may use the contextual data to provide contextual offers that include one or more products related to the contextual data. For example, a subscribed customer may be a 30 year old woman that is an expert surfer, spends more than $10k on surfing products and vacations per year, has a Platinum loyalty status with the system, is located within one mile of the geographical merchant consortium geographic region and has specified they need a new surfboard and swimsuit. These two products may be offered from a single merchant of the merchant consortium or from two different merchants and be a combined contextual offer. The combined contextual offer may be 20% off when the subscribed customer purchases both the surfboard from a first merchant and the swimsuit from a second merchant. The subscribed customer may respond to the combined contextual offer and purchase the two products through the system using any suitable payment method. Note that the two products may be provided for pickup in a single location. Also, the geographical merchant consortium commerce system may provide a map showing the location of the two merchants along with directions to facilitate the customer picking up the purchased items, or to simply go to merchant's location to see the items.

An exemplary geographical merchant consortium commerce system produces event contextual offers that include one or more products related to an event, such as a demographic date. As an example, on or before the subscribed customers wedding anniversary, the geographical merchant consortium commerce system may provide combined event contextual offer that includes two or more products provided by two or more of the merchants. The offer may be dinner at a first merchant, movies or a show at a second merchant and drinks and desert at a third merchant for the subscribed customer and spouse. The subscribed customer may purchase the combined event contextual offer through their mobile device and a receipt and/or ticket may be provided for them to acquire the products at the merchants, such as a bar code or QR code.

An event contextual may be an offer based on a demographic date of the customer or of a family member, friend, co-worker, religious affiliation group member, sports group member, group member defined in the merchant consortium system and the like. For example, a customer may receive an event contextual offer to purchase a toy for their nephew's birthday. This event contextual offer may be an item on the nephew's shopping list or a smart need product, a product the system recommends for the nephew. The event contextual offer for the nephew may include the nephew's birthday date and may ensure shipping and delivery by this date, A customer may be a member of various groups through the geographical merchant consortium commerce system and these groups may allow sharing of information such as shopping lists, demographic events and the like. A customer may allow or turn-off sharing of information with groups as they desire.

A contextual offer, such as an event contextual offer, may be created through collaboration of the merchants, wherein a plurality of merchants provide offers for their respective products that are then combined into a combined contextual offer. For example, an event for a customer may prompt a first merchant to initiate an offer that is then forwarded to or visible to other merchants for them to add additional products and approve of the combined contextual offer. It may be an open and incomplete offer that other merchants can add to. A first merchant may be a florist that initiates the combined offer with a flower delivery and a second merchant may be a restaurant and a third merchant may be a theater company that adds a show to the combined event contextual offer. A first merchant may alternatively add an offer on behalf of a second merchant and third merchant before sending the combined contextual offer to those merchants for approval and adjustment. A merchant may adjust their respective price, discount, product, package discount and the like, including by setting contextual targeting criteria such that different users receive different price, discount, product, package discount, and the like. For example, a Platinum level status subscribed customer may receive a 20% discount whereas a Silver level status user may receive a 10% discount for the same products.

An exemplary geographical merchant consortium commerce system has a shopping list input feature for a subscribed customer to input products to a shopping list. The product description for an item on the shopping list may be very specific such as ABC yellow golf balls, or may be more general, such as golf balls. The system may provide the ability to produce multiple types of shopping lists such as grocery lists, personal lists, family lists, group lists and the like. A shopping list may be accessed or shared by one or more subscribed customers. For example, a shopping list may be accessed by a married couple, whereby each can input items to the list and keep track of what is needed. A shopping list input feature may include a variety of inputs from the customer including text description, photo, video, file, price range, timing, and the like. A shopping list input feature may also include predictive features to facilitate the customer in item description creation as well as product search and selection. These predictive features include proposed key terms, proposed merchants and locations, map displays, scheduling features, purchase features, questionnaire features and the like. In another embodiment, a scout troop has a plurality of members on the geographical merchant consortium commerce system including the leaders and the scout members. The leaders may have access to add items to the shopping list and may received contextual offers. The scout troop may input demographic information into the system for the scout members and event contextual offers may be initiated for the scout member's birthdays, for example.

A shopping list may be red with a plurality of merchants in the geographical merchant consortium commerce system, and sharing may be according to the desired privacy settings input by the customer. For example, a customer may select which merchants they will allow their shopping list to be shared with. Merchants may provide offers to the customer for one or more items on the shopping list. This offer may be accepted or a counter offer may be proposed by the customer. Merchants may compete for the customer's business through contextual offers and promotions.

The geographical merchant consortium commerce system may provide a shopping list contextual offer wherein all the products are provided by a single merchant or a combined shopping list contextual offer wherein products on the shopping list are offered by two or more of the merchants. These shopping list contextual offers may be provided to a single customer or to a plurality of customers, such as all of the customers that are part of a family list, for example. A set of customers may be part of a family or group that have access to inputting items to the shopping list and receiving shopping list offers.

An exemplary geographical merchant consortium commerce system has a smart needs feature that uses machine learning to determine smart needs, or smart need products that the subscribed customer may desire. The smart needs feature may utilize contextual data input by the customer including demographic contextual data and may monitor the subscribed customer's internet activity to determine a smart need product. The smart needs feature of the operating system may monitor and/or analyze contextual data of a customer including internet activity that is monitored and/or analyzed with machine learning, artificial intelligence or other techniques; wherein the internet activity may include websites visited, product searches, social media posts, travel itinerary, calendar inputs, shopping history, shopping list products, purchasing history, what merchants the customer purchases from, nearby merchants and their offers and packages, current location, day, time, and the like. The operating system may produce a list of smart needs for a customer and these smart needs may be visible to the merchants of the geographical merchant consortium commerce system; allowing them to make smart need offers for these products to the customer. The exemplary geographical merchant consortium commerce system may produce smart needs contextual offers having one or more products determined by the smart need feature. For example, a subscribed customer may be visiting websites for golf clubs and may be conducting product searches for golf clubs and the geographical merchant consortium commerce system may provide a smart need offer for 25% off golf clubs from one of the plurality of merchants.

A customer may select a proposed or recommended smart need product and place it in their shopping list. Again, the product description may be very specific such as ABC yellow golf balls, or may be more general, such as golf balls. Furthermore, a contextual offer may include a shopping list product and a smart need product, a recommended product that the system predicts they may want to purchase. For example, the geographical merchant consortium commerce system may send out a contextual offer with some items from the shopping list and one or more smart need products all available from a single merchant or a plurality of merchants.

An exemplary geographical merchant consortium commerce system may have a smart interface to predict products that the customer may need or may be searching for. The smart interface may have prompts to help the customer select products of interest, maps to show the location of merchants that carry a product of interest, scheduling software to book a time for a service type product, such as nails, reviews of the merchant and the like. The smart interface prompts may be derived from the machine learning of that customer and may include smart need products.

An exemplary geographical merchant consortium commerce system produces contextual offers that are proximity offers, wherein the offer is proved when the subscribed customer moves within a proximity distance of a geographical region or a particular merchant location. For example, the subscribed customer may be driving an come within 4 km of the geographical region of the merchant consortium, a local mall, and the exemplary geographical merchant consortium commerce system may then send out a proximity contextual offer. The proximity contextual offer may be any type of contextual offer including the shopping list contextual offer, event contextual offer, or smart need contextual offer; and any of these offers may be combined contextual offers having two or more products offered by two or more of the merchants. For example, a subscribed customer may receive a proximity shopping list contextual offer when they drive by the grocery store, and this offer ay be replicate of a shopping list contextual offer that was previously sent to the customer and now replicated due to their proximity to the geographical region. In another example, a subscribed customer may receive a proximity event contextual offer on their birthday for half off dinner when they drive by a restaurant that is part of the geographical merchant consortium commerce system.

The proximity region may be set by the customer to enable them to control the proximity distance. They may enlarge the range to cover an area that they often drive through to promote and encourage more offers from the system or reduce proximity region. The customer may also explicitly notify a merchant through the geographical merchant consortium commerce system when they are in or within a certain distance of the store. The proximity region may be set by the geographical merchant consortium commerce system and derived from analysis of the customer's location, including home and workplace locations, and travel patterns. This may be set automatically through an algorithm of the system or manually.

The exemplary geographical merchant consortium commerce system may provide a map showing the location of all of the merchants that participate in the geographical merchant consortium commerce system and these merchants may provide an automatic discount for subscribed customers, such at 10% some or all of their product or services. A map may also be provided along with driving directions when a contextual offer is provided or when the contextual offer is accepted. Again, when the offer is a combined offer, the two or more products from the two or more merchants may be providing in a single location for pick-up. Likewise, any of the contextual offers having a plurality of products may be provided for pick-up. For example, a subscribed customer may receive a shopping list contextual offer and accept the offer and pick-up the items, such as groceries from a pick-up location on their way home. A map may be provided of merchants carrying a product when a customer is searching for products and/or placing products on a shopping list.

An exemplary geographical merchant consortium commerce system has a customer search region, a region within which subscribed customers are identified to a merchant through the operating system, such as on a map display. This customer search region enables a merchant to send offers to these customers when they are within the region. A merchant may be able to control the range of this customer search region to enable the merchant to better find potential customers. Furthermore, customers with shopping list or smart need products that match products in the merchant's store may be further identified enabling the merchant to provide an offer for that or those products, further encouraging them to come into the store location. For example, a map may be displayed showing the location of customers, and some of these customers may be identified as likely customers, or customers that have shopping list and/or smart need products available from said merchant. The merchant may select these customers to further determine the products that match their product offering and the merchant may then send a contextual offer to the likely customer. A customer may have the ability to turn off this feature in the event they do not want to receive these offers when in a customer search region.

An exemplary geographical merchant consortium commerce system may provide subscribed customers incentives to shop and make purchases with the merchants of the system. Loyalty Points may be acquired when customer visits and/or makes purchases from a merchant, and other criteria. These points may grow and be redeemed for discounts or products or reflect Loyalty Status levels like Bronze, Silver, Gold and Platinum. Loyalty Status levels allows for a refined level of targeting and discounts for those customers. For example, a Platinum status level customers may receive an offer for 20% off shoes whereas Silver level status members receive an offer for 10% off shoes, either as a standalone contextual offer or a combined contextual offer. Loyalty may apply to customers as well as merchants. Merchants also participate in the program and earn points that may be used for discounts on transaction fees. Points earned vary according to the context of the transaction, such as a Platinum Customer transacting with a consortium of Platinum merchants will earn more points than the Silver Status equivalents. In addition, the geographical merchant consortium commerce system may provide incentive to sign up others to the system. The subscribed customer may receive a referral incentive, such as points or additional discounts that can be used with one or more of the merchants.

An exemplary geographical merchant consortium commerce system has a customer offer input feature to allow a customer to input items and offers or combined offers for the product or products. The merchants of the geographical merchant consortium commerce system may then accept, modify or make additional proposals to the customer based on the customer offer input.

An exemplary geographical merchant consortium commerce system has a customer privacy input feature to enable the customer to set privacy levels to control the amount and/or type of information shared with merchants. A customer may set a privacy level for all the merchants or have a different privacy level for various merchants. Likewise, a customer may disable offers from certain merchants, such as those merchants providing products that are not of interest to the customer.

A customer may have access to another customer's smart needs or shopping list and may purchase products or accept offers from merchants on behalf of the other customer. For example, a parent may monitor the recommended smart need products or products on a shopping list for their child and may also receive the offers sent to the child for review. The parent may appear to the system as if they were the child, including the child's contextual data, and as such, accept offers and purchase products for their child through the system.

An exemplary geographical merchant consortium commerce system may include a demand list of products that is includes the number of products on the customers shopping lists. This list may include specific product details including the product maker, style, size or color, for example. This demand list of products may be accessible by the merchants and it may help the merchant to maintain adequate inventory levels and/or predict changes in inventory. If a merchant observes that there is a large increase in demand for a particular product, the merchant may order a larger quantity and receive a discounted price that may then be passed on to the customer, or retained as higher profit margin. The demand list may be presented in list or graphical formats to further enable a merchant to see trends. All of the customer's shopping list products may be included in this demand list; even if the customer has opted that a particular merchant not have access to their shopping list, as there is no tie between this summarized quantity of products and a particular customer.

Definitions

Geographical region, as used herein, is a physical region that the consortium of merchants operate and may be defined by a perimeter area such as a radius, a given structure or location such as a mall including a strip mall, beauty mall, salon suite, farmer's market, pop-up market, town, zip code, or by the area that includes each of the plurality of merchants. A pop-up market is a market of a plurality of merchants that is set up A customer search region, as used herein, is a region within which subscribed customers are identified to a merchant through the operating system, such as on a map display. A merchant may send a contextual offer to a customer when the customer moves within the customer search region and this offer may be automatic or manually generated.

A user interface to the operating system may be a mobile application, API, a website on a computing device and the like.

Contextual offers, as used herein, are offers that are personalized to the customer, based on contextual data including, but not limited to, demographic data, geographical data, socioeconomic data, date contextual data, interest contextual data, smart need contextual data, shopping list contextual data and the like. A contextual offer may be hyper-personalized and may include a smart need product derived through artificial intelligence, machine learning and other techniques, A contextual offer may be a proposed price for a product or products and this proposed price may be a discounted price a bundled price for a plurality of products, special services including reservation times, seating location in a theater and the like. A customer may purchase the entirety of the products or may pay a down-payment and then pay a balance upon receiving the product or products. For example, an event contextual offer may include dinner, movie and dessert all at 20% off. The customer may accept the offer and pay a down payment and receive bar code or codes to receive the discounted prices at one or more of the merchants. The bar code may represent the down payment at one or more of the merchants and then the customer may pay a balance. Dinner cost for example may depend on the food and drink ordered for example. The down payment may include the total payment for one or more of the products from their respective merchants and the balance due payable upon receiving the product, for example, after ordering Dinner.

A combined contextual offer, as used herein, is a contextual offer having two or more products from two or more of the merchants of the geographical merchant consortium commerce system.

An event contextual offer, as used herein, is a contextual offer that includes one or more products related to an event, such as a demographic date for a customer or customers. For example, an event contextual offer may be flowers for a wedding anniversary. An event contextual offer may be a combined offer with products from two or more of the merchants and may be a proximity offer, delivered to the customer when they move within a proximity region.

A shopping list contextual offer, as used herein, is a contextual offer that includes one or more products corresponding to a customer's shopping list. A shopping list may be a family shopping list and the shopping list contextual offer may be sent to two or more customers of the geographical merchant consortium commerce system. A shopping list contextual offer may be a combined offer with products from two or more of the merchants and may be a proximity offer, delivered to the customer when they move within a proximity region.

A smart need contextual offer, as used herein, is a contextual offer that includes one or more smart need products, a product recommended by geographical merchant consortium commerce system through machine learning of the customer's internet activity, as described herein. A smart need contextual offer may be a combined offer with products from two or more of the merchants and may be a proximity offer, delivered to the customer when they move within a proximity region. product is a prod Event contextual data includes, but is not limited to, personal dates of interest of the user including, but not limited to, birthday, wedding anniversary, relatives' birthdays, occupational anniversaries and the like.

Geolocating as used herein, is a process of the operating system to identify the location of a subscribed customer and wherein the location may be used to prompt the operating system to automatically send a contextual offer, or to send a notice to one or more of the merchants, whereby the merchant may manually send a contextual offer with targeting criteria as part of a campaign or directly. For example, a merchant may utilize geolocating to identify customers nearby according to a criterion and send them a directed offer for 20% off golf balls. Geolocating may operate by utilizing the global positioning system of a subscribed customer's mobile device, such as a mobile telephone. A subscribed customer may have to authorized tracking of their location through the operating system or may opt out from geolocating at any time, such as when out with friends in the geographical region.

User input, as used herein, includes input to the system by keyboard, touch-screen, verbal input, image input, QR code input, RFID input and the like. For example, a customer may input products to the system by word search, image search, bar or QR code input, RFID input, verbal input and the like.

QR code, as used herein, is any machine-readable code and may comprise an array of black and white squares or lines. A QR code includes bar codes and these codes are typically used for storing URLs or other information for reading by a scanner, or camera, such as a camera on a smartphone.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
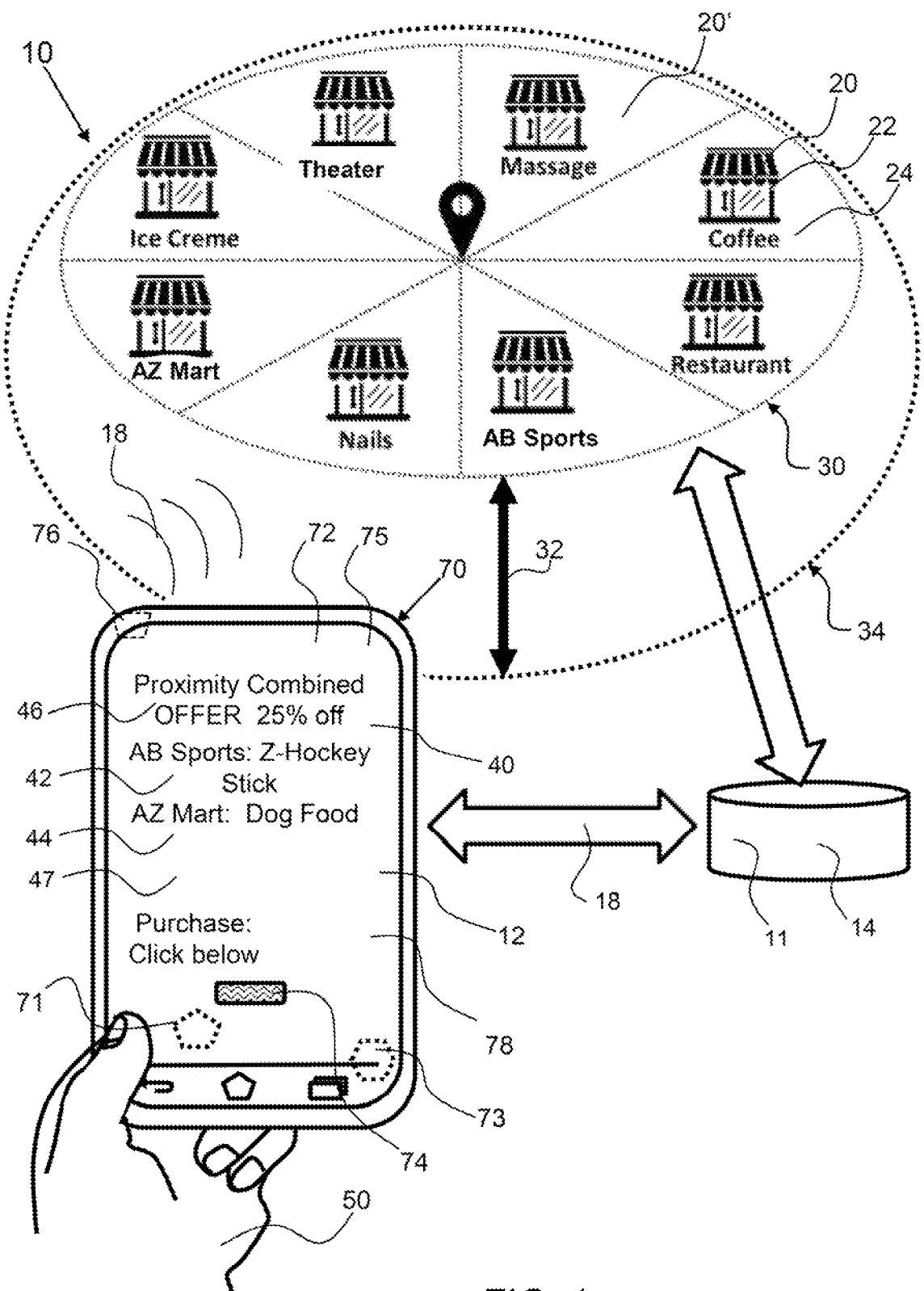
FIG. 1 shows a diagram of an exemplary geographical merchant consortium commerce system that is sending a subscribed customer a proximity combined contextual offer because they have entered into a proximity distance from the geographical region of the plurality of merchants.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary geographical merchant consortium commerce system 10 enables a plurality of merchants 20, 20' to provide a combined contextual offer 42 to a subscribed customer 55. This contextual offer 40 is a combined contextual offer 42, or an offer for products offered by two or more of the merchants, AB Sports and AZ Mart as shown. These two merchants have a physical store 22 within a geographical region 30 defined by the geographical merchant consortium commerce system 10. The geographical region may be defined by a single structure 24 such as a mall or strip mall. The subscribed customer 50 has entered within the proximity region 34, indicated by the outer dashed line, or within a proximity distance 32, indicated by the double arrow line, from this geographical region and this has prompted an automatic proximity contextual offer 44 to be sent to the subscribed customer's mobile device 70, a mobile phone 72. The geographical merchant consortium commerce system 10 comprises an operating system 11 and database 14 that produces a wireless signal 18 containing the proximity contextual offer that is received by the wireless transceiver 76 of the mobile phone when the subscribed customer moves within this proximity distance, and since this offer is for products offered by two or more of the merchants, this a proximity combined contextual offer 46, Furthermore, this contextual offer may be for products that the subscribed customer has placed on a shopping list thereby making this offer a combined shopping list contextual offer 47. This offer screen of the website 12 of the geographical merchant consortium commerce system 10 may automatically display on the display screen 78 of the mobile device when the subscribed customer enters the proximity distance and this may all enabled by geolocating the subscribed customer through the global positioning system 73 of the mobile device 70.

Figure 2:
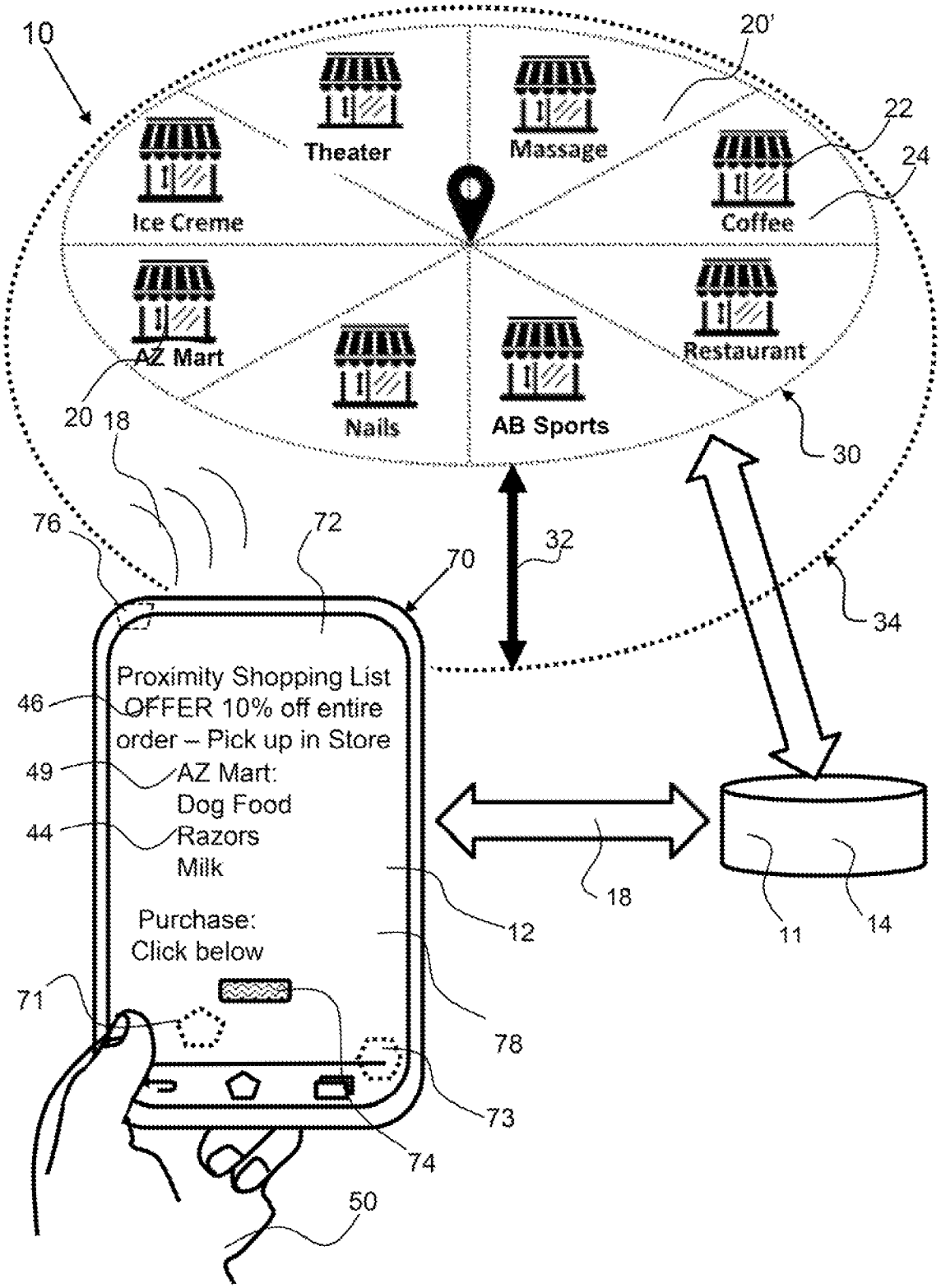
FIG. 2 shows a diagram of an exemplary geographical merchant consortium commerce system that is sending a subscribed customer a proximity shopping list contextual offer because they have entered into a proximity distance from the geographical region of the plurality of merchants.

As shown in FIG. 2, an exemplary geographical merchant consortium commerce system 10 enables a merchant 20, provide a shopping list contextual offer 49 to a subscribed customer 55. The offer is for products on the customers shopping list and is for 10% off the entire order and allows the customer to pick up the items at the store. As a convenience, the merchant may prepare the products for the customer to simply pick up upon purchasing the offer through the user input 74. Again, this is a proximity contextual offer 44 as the offer is sent to the customer due to their proximity to the merchant, as described in FIG. 1.

Figure 3:
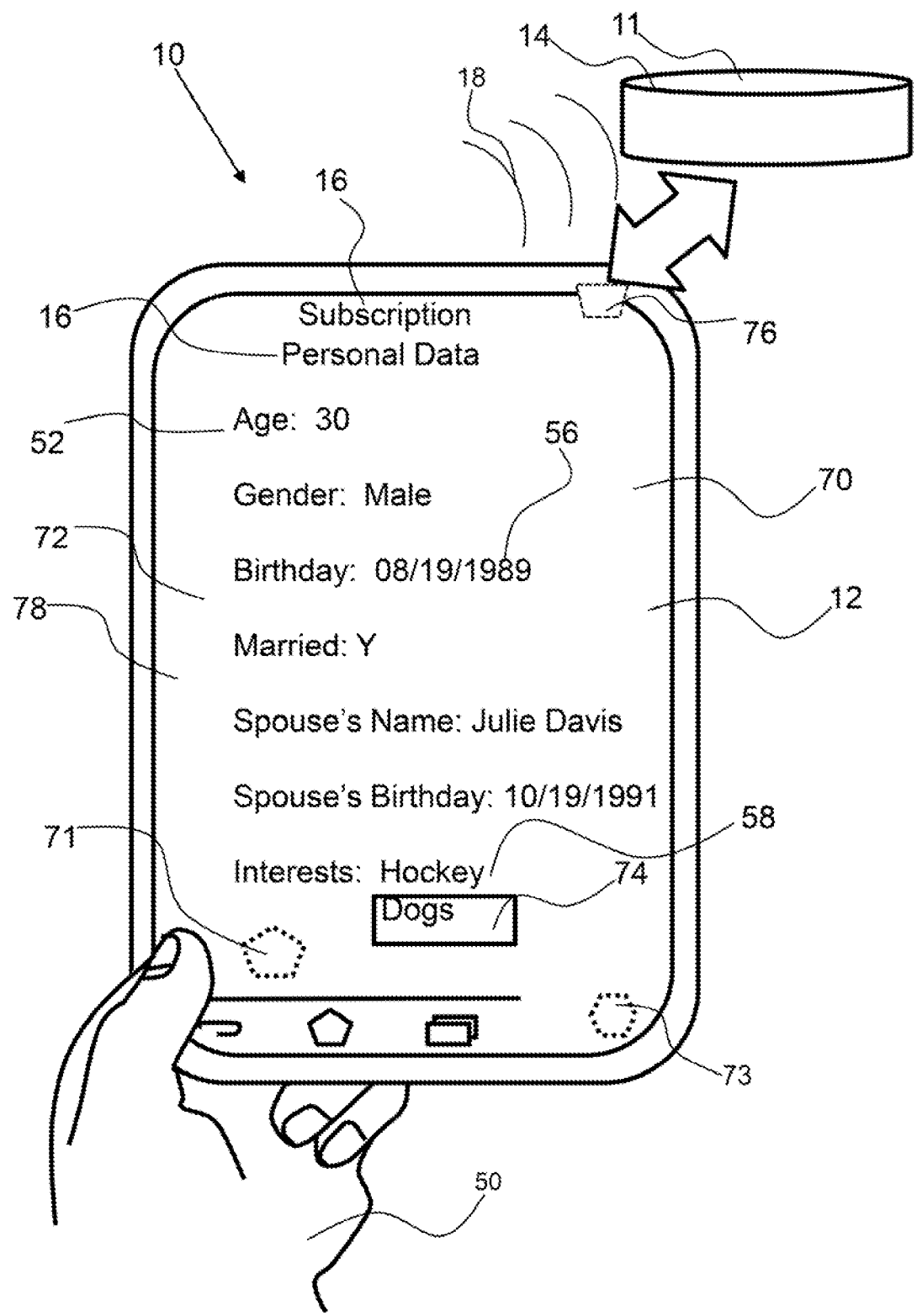
FIG. 3 shows an exemplary customer subscription feature of a geographical merchant consortium commerce system wherein the customer inputs contextual data including contextual event data, such as birthdays and interest contextual data such as hobbies.

As shown in FIG. 3, the subscribed customer 50 is using the customer subscription feature 16 to input contextual data 52 including age, gender, birthday, marital status, spouse's name, spouse's birthday and interests. The contextual data includes contextual event data 56, or data related to a date or time that is relevant to the subscriber, such as their birthday, their spouse's birthday, partner's birthday, child's birthday and the like. The exemplary customer subscription feature 16 of the geographical merchant consortium commerce system 10 may enable the customer to input contextual interest data 58 such as hobbies and topics of interests, such as sports or sculpting, or politics, respectively. This personal and contextual information may be used by the geographical merchant consortium commerce system to produce offers that are sent to the subscriber's mobile device. The geographical merchant consortium commerce system may open a page of the website 12 with the offer or send the subscribed customer a text for example. The contextual offer may be related to the subscribed customer's input interest, for example.

Figure 4:
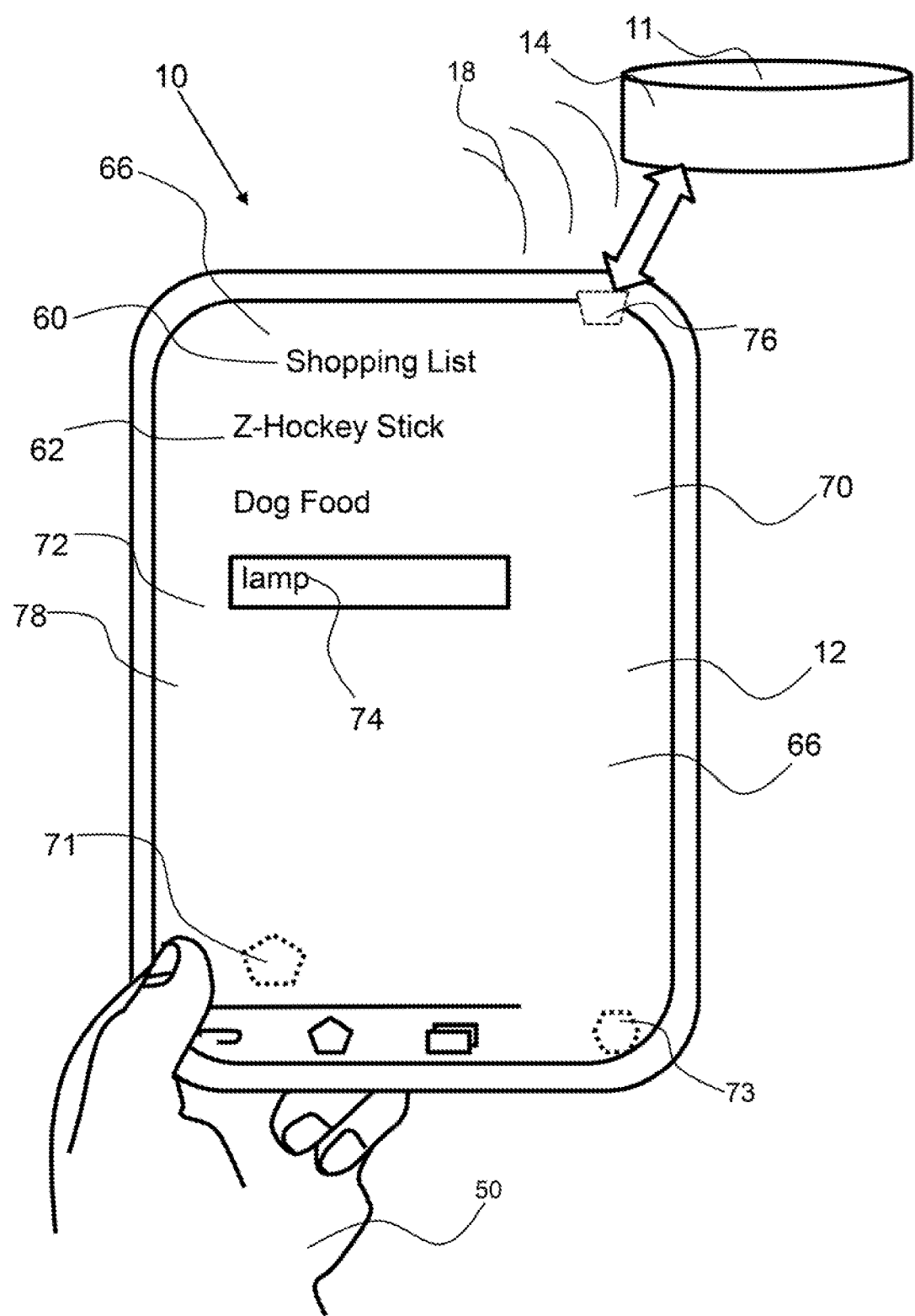
FIG. 4 shows an exemplary customer shopping list input feature of a geographical merchant consortium commerce system wherein the customer inputs desired products.

As shown in FIG. 4, an exemplary customer shopping list input feature 66 enables a subscribed customer 50 to input desired shopping list 60 having one or more shopping list products 62 into the geographical merchant consortium commerce system database 14. The geographical merchant consortium commerce system may use this list to produce offers that are sent to the subscribed customer. These offers may be a combined offer, wherein the two or more of the shopping list products are offered to the subscriber customer from two or more of the merchants, one product from one merchant and one product from a second merchant. The combined offer may require the subscribed customer to buy both products and they may purchase the products on-line, such as through their mobile device and then simply pick up the items at one or at both merchants. The geographical merchant consortium commerce system may provide a pick-up for a combined order at only one of the merchant's physical store. Alternatively, the products could be shipped or otherwise provided at a location requested by the subscribed customer. The subscribed customer 50 is using a user input to input items into the shopping list. It is understood that the input may include a search and then a selection of a product as is well known and used by existing on-line retailers.

Figure 5:
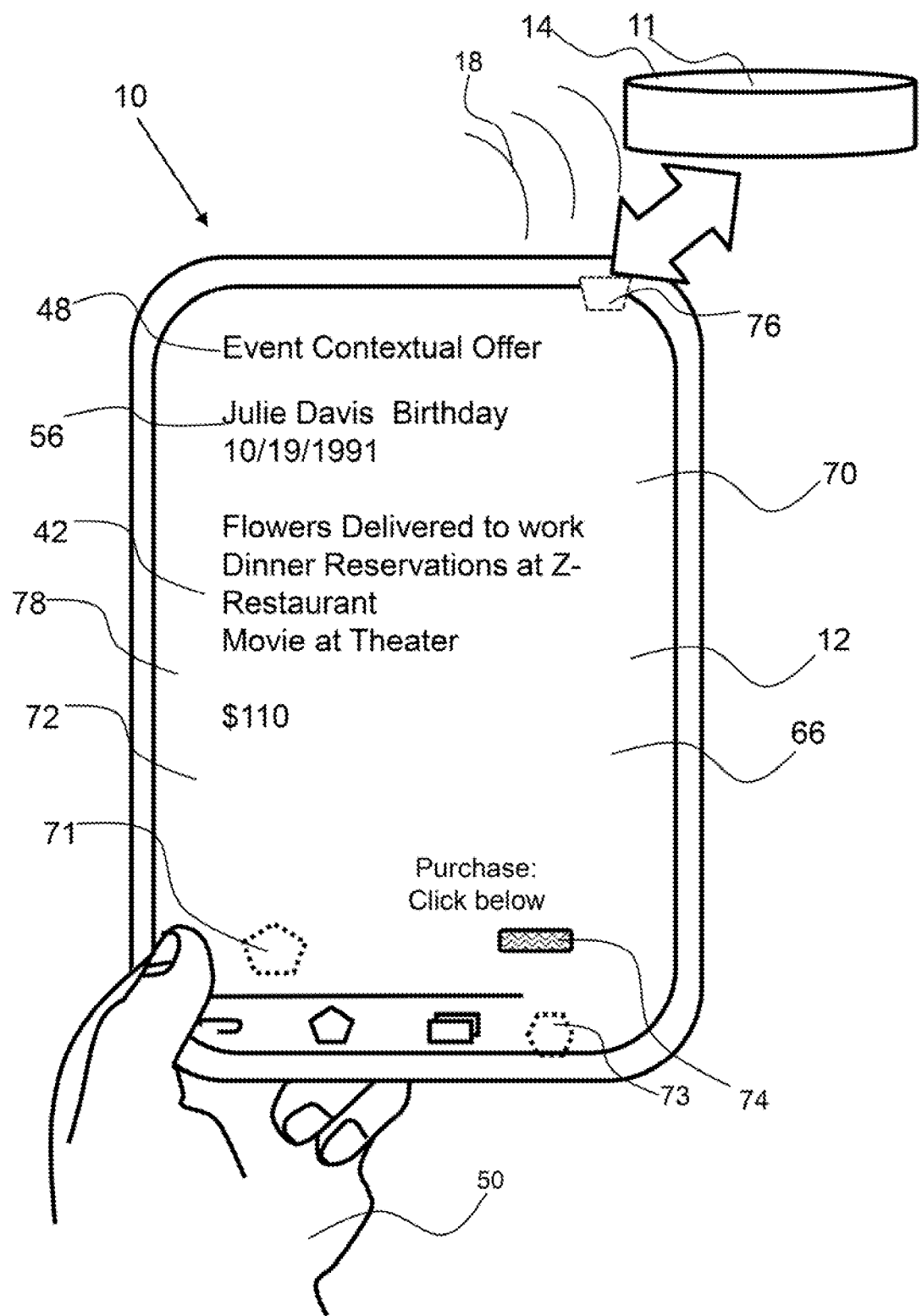
FIG. 5 shows a diagram of an exemplary geographical merchant consortium commerce system that is sending a subscribed customer a combined event contextual offer because their spouse has an upcoming birthday.

As shown in FIG. 5, an exemplary geographical merchant consortium commerce system 10 is sending a subscribed customer 50 a combined event contextual offer 48 for their spouse's upcoming birthday. The combined contextual offer includes products from two or more of the merchants offered at one combined price, $110. The subscribed customer can simply purchase the combined event contextual offer through the mobile device 70 through the user input feature 74.

Figure 6:
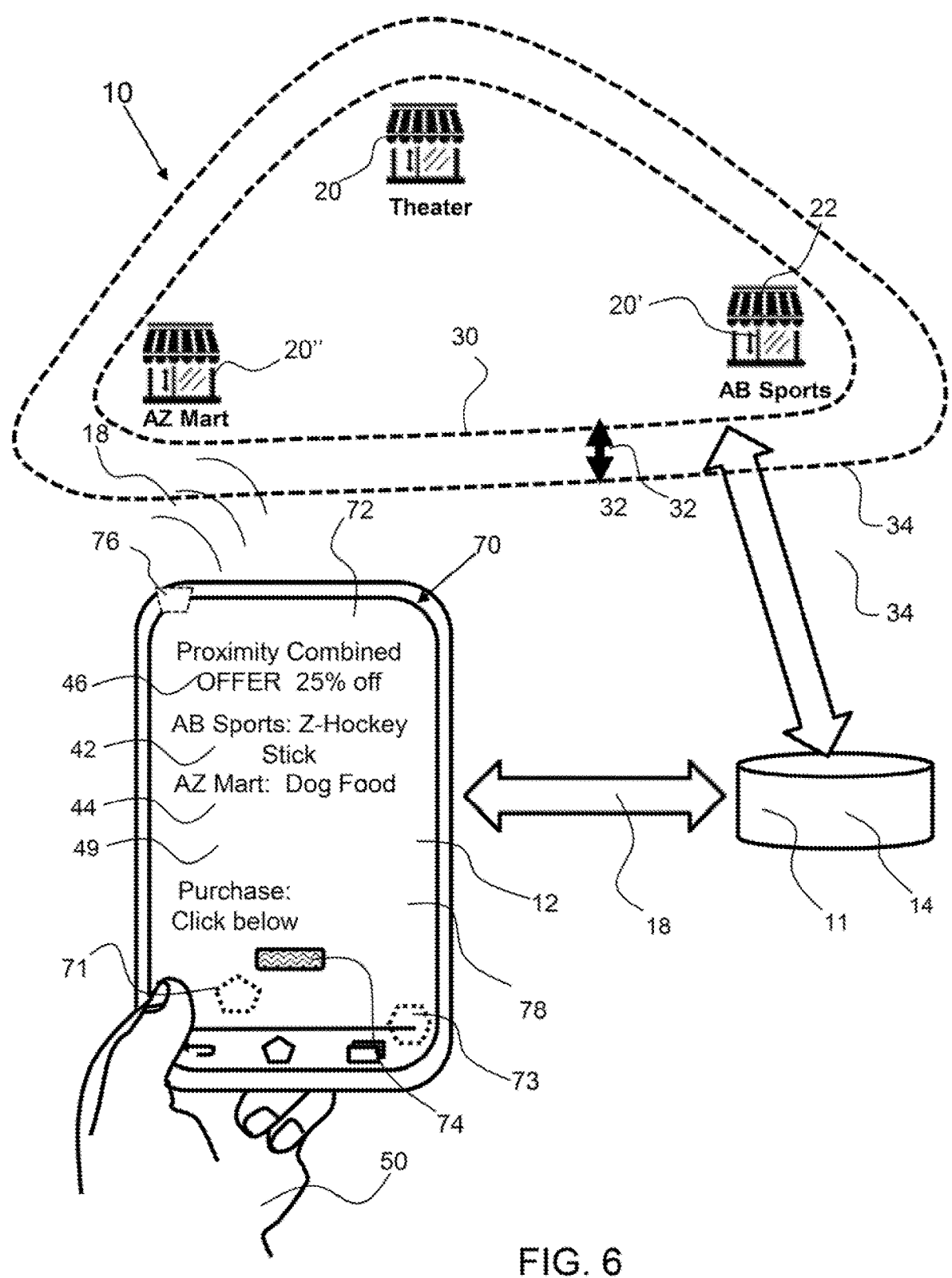
FIG. 6 shows a diagram of an exemplary geographical merchant consortium commerce system that is sending a subscribed customer a proximity combined contextual offer because they have entered into a proximity distance from the geographical region of the plurality of merchants.

As shown in FIG. 6, the geographical region 30 extends around the physical store locations 22 of the plurality of merchants 20-20". The geographical region may be defined by an area of the closest stores of the plurality of merchants as shown.

Figure 7:
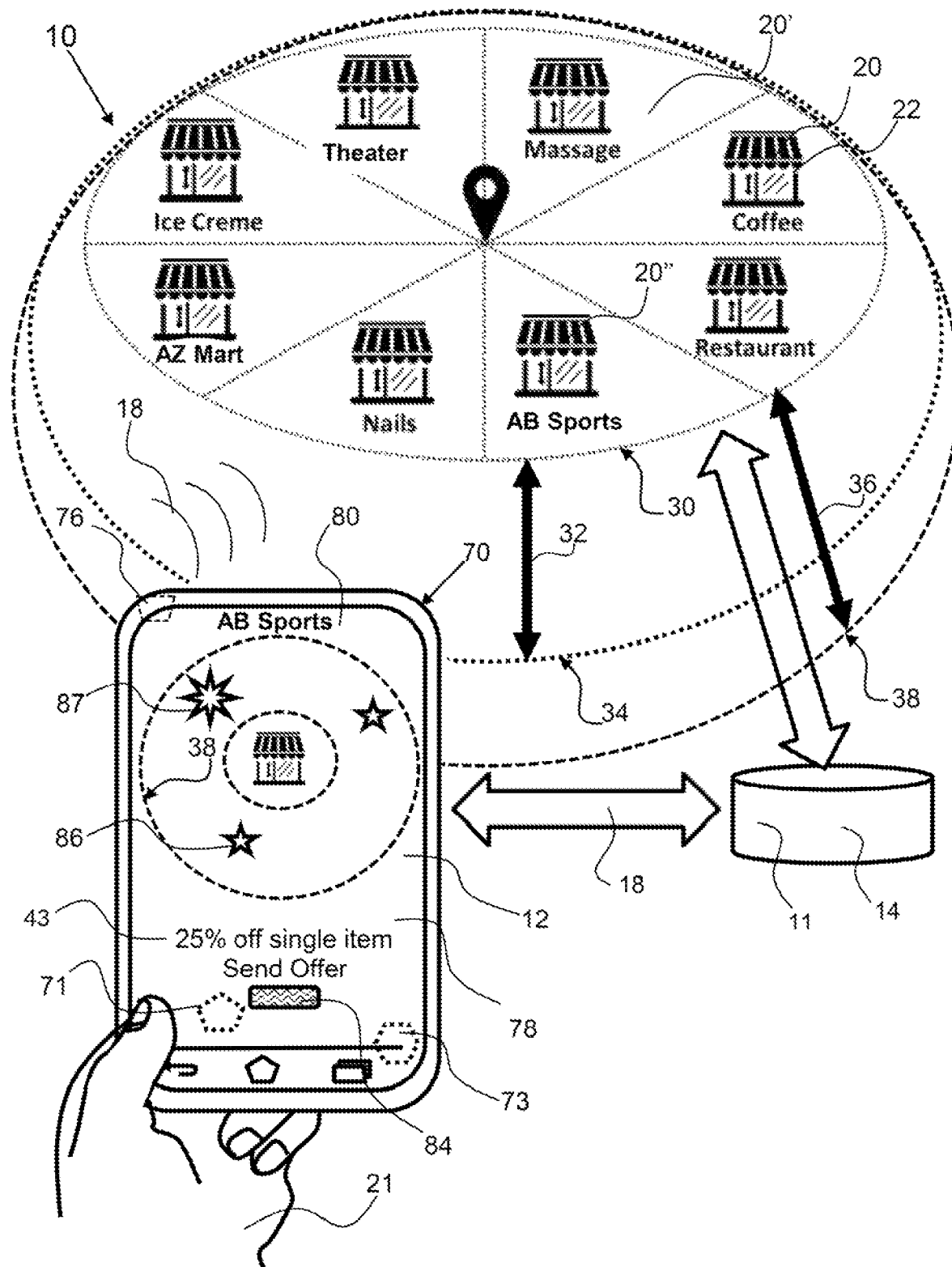
FIG. 7 shows a diagram of an exemplary geographical merchant consortium commerce system and a merchant associate viewing the location of customers icons within a customer search region on a map display.

As shown in FIG. 7, an exemplary geographical merchant consortium commerce system 10 has a customer search region 38, a region within which subscribed customers are identified to a merchant or a merchant associate 21 through the operating system, such as by customer icons 86 on a map display. This customer search region enables a merchant to send offers, a merchant proximity offer 43; to customers when they are within the region or within a customer search distance 36 from the geographical region or from a particular merchant location. The merchant 20" in this example is AB Sports. The merchant may be able to control the range of this customer search region to enable the merchant to better find potential customers. If it is a slow day, the merchant may expand the customer search region to identify more customers and may then send a contextual offer, such as 25% off a single item, as shown, using the merchant input 84 on the merchant interface 80, such as a mobile phone 70. The merchant may be able to create a contextual offer that is then sent to the customers within the customer search region and this offer may be a text message or a pop-up offer on their respective mobile devices or computers for example. Furthermore, customers with shopping list or smart need products that match products in the merchant's store may be further identified as likely customers to the merchant. For example, a likely customer icon 87 may be different than a customer icon 86 on the map display. Note that a list of customer and likely customers may be provided in a list to the merchant as well and may have the proximity distance from the geographical region or their store. The merchant may select only likely customers and send a contextual offer to only these customers within the customer search region. As shown on the map display of the mobile phone, the likely customer icon 87 is different from the customer icon.

Figure 8:
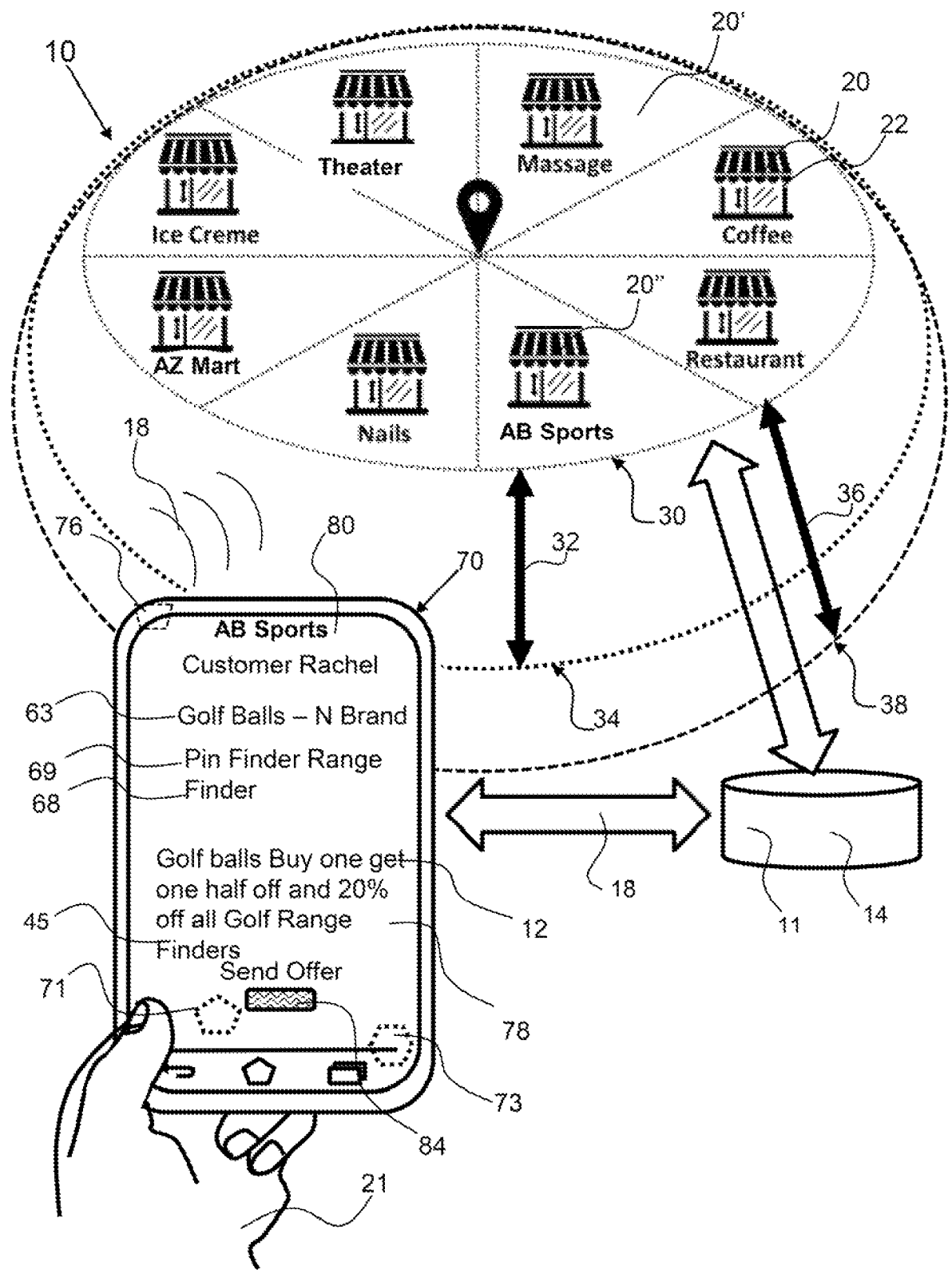
FIG. 8 shows the diagram of an exemplary geographical merchant consortium commerce system as shown in FIG. 7 after the merchant associate has selected a customer icon to view the customers products including shopping list and recommended smart need products.

As shown in FIG. 8, a merchant may select a likely customer to see products that match products that they offer such as matching shopping list products 63 and matching smart need products 69. The customer previously added golf balls to their shopping list and the operating system of the geographical merchant consortium commerce system recommended a range finder as a smart need product 68 to the customer. The merchant can then produce a likely customer contextual offer 45 and send to that specific customer. Note that this type of customer searching may be ideal for mobile or popup businesses. A food truck operator may be able to notify customers of their location using this system. A customer may have the ability to turn off these customer search and offer features in the event they do not want to receive these offers when in a customer search region.

Figure 9:
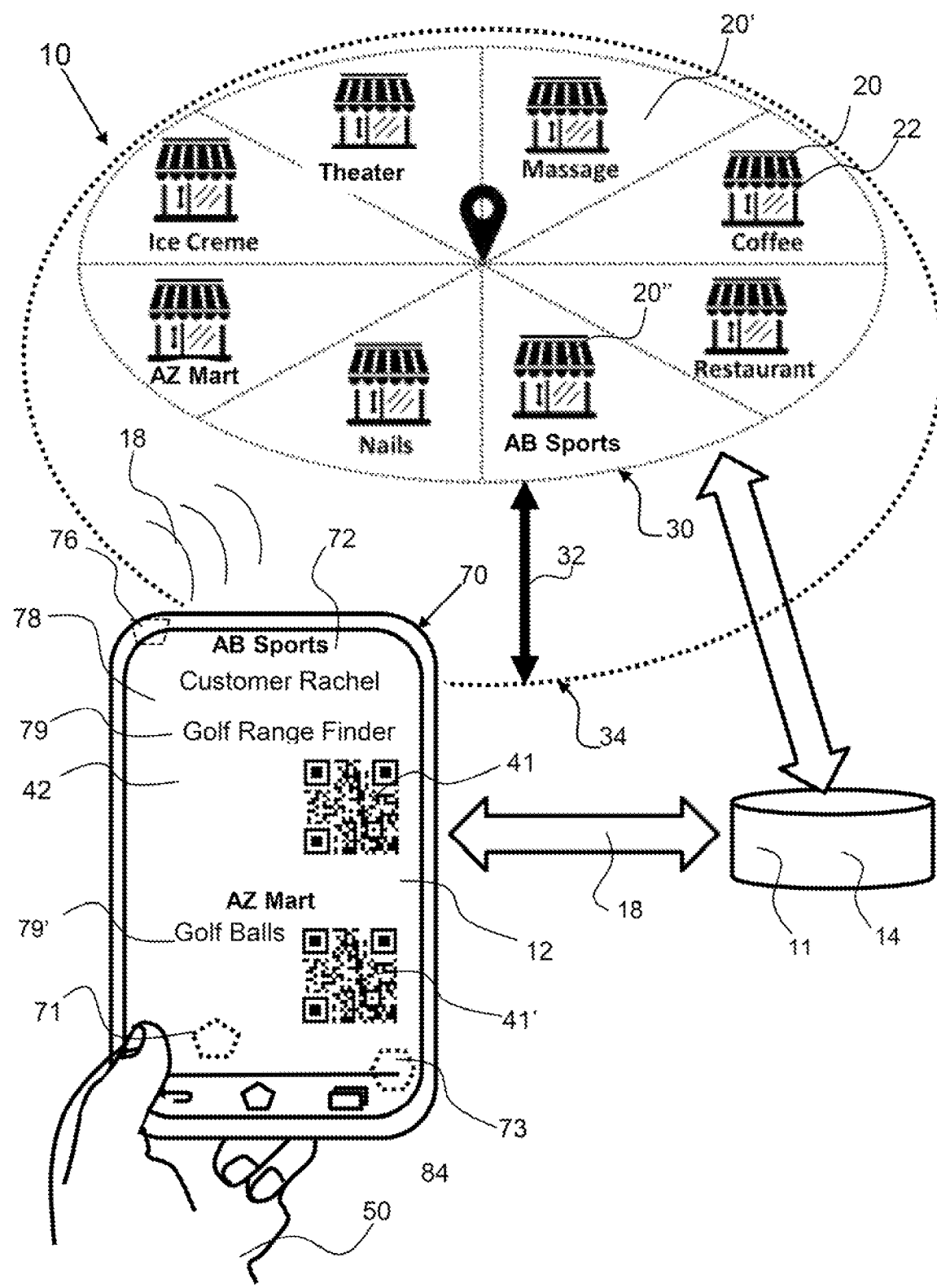
FIG. 9 shows a diagram of an exemplary geographical merchant consortium commerce system and a customer viewing the proof of purchase having QR codes for products of a combined contextual offer.

As shown in FIG. 9, a combined contextual offer 42 has been accepted by the subscribed customer 50 and their mobile device 70, a mobile phone 72, provides a proof of purchase 79, 79' for two products, a Golf Range Finder and Golf Balls, provided by two different merchants, AB Sports and AZ Mart, respectively. The proof of purchases each include a QR codes 41, 41' for the products from the combined contextual offer. These QR codes may be used to show proof of purchase at the merchant location or to provide a discount from a purchase price on one or more products. For example, the QR code for the range finder may be used to show payment for the product and the customer may simply scan the QR code at AB Sports to show proof of purchase for the Range Finder. The QR code for the Golf Balls as AZ Mart may be a discount code, such as 20% off and the customer may pick up one or more pack of golf balls and get 20% off at the register by scanning this QR code. The mobile device 70 is an example of a computer 75 having a microprocessor 71. The mobile device also comprises a global positioning system 73 for geolocating with the geographical merchant consortium commerce system 10. The mobile device has a user input 74, such as a touch-screen type display screen 78 and voice command recognition utilizing a microphone. The mobile device has a wireless transceiver 76 for communicating with the geographical merchant consortium commerce system 10 with wireless signals 18.

Figure 10:
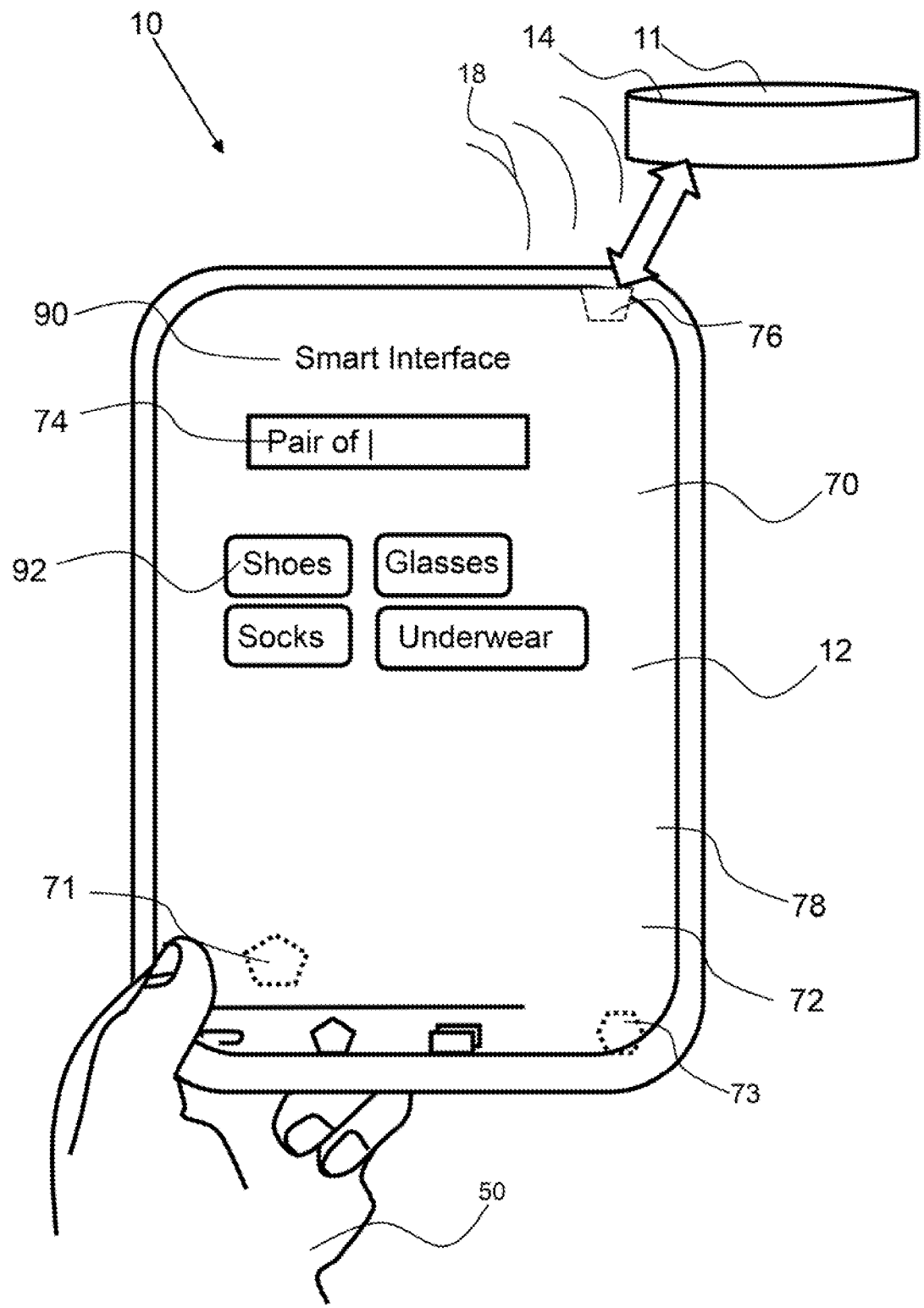
FIG. 10 shows a diagram of an exemplary smart user interface that prompts the customer for products that they may desire based on smart needs.
Figure 11:
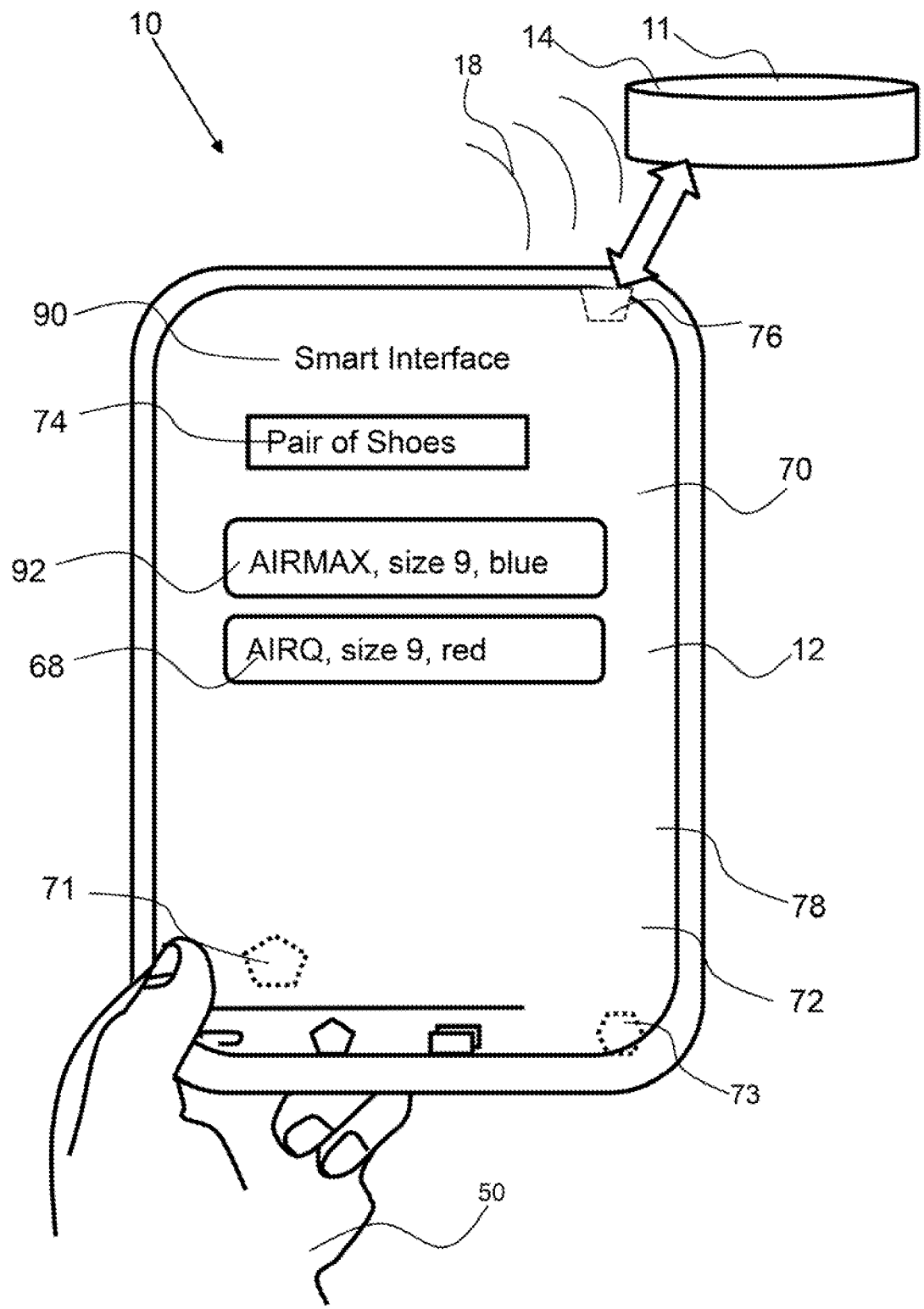
FIG. 11 shows a diagram of an exemplary smart user interface that prompts the customer for products that they may desire based on smart needs.
Figure 12:
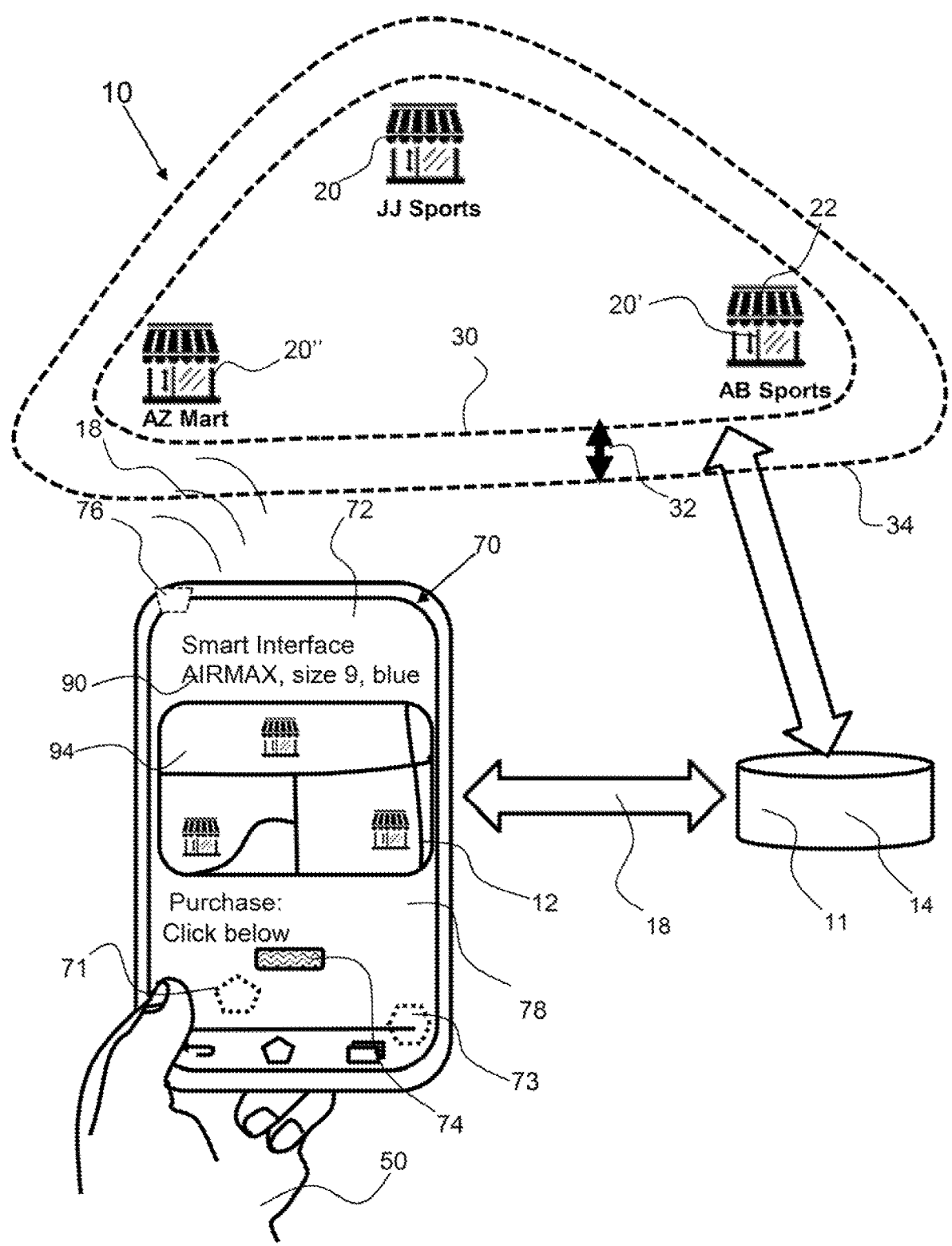
FIG. 12 shows a diagram of an exemplary smart user interface that shows a map of merchants that carry a product the customer may want to purchase.

Referring now to FIGS. 10 to 12, an exemplary smart user interface 90 prompts the customer with recommended products 92, or smart need products 68 that they may desire based on smart needs as they input information into the user input 74. A customer may start typing in "Pair of", as shown in FIG. 10, and the operating system 1 of the exemplary geographical merchant consortium commerce system 10 may recommend Shoes, Glasses, Socks, Underwear, based on machine learning from the customer's contextual data and internet activity. The customer may select one of the recommended products by clicking on the icon for that product and the smart interface may recommend more specific product details or a specific product as shown in FIG. 11. After the customer has selected a particular product or products, a smart interface display map 94, with merchants supplying the product(s) may be provided to the customer on the mobile device, as shown in FIG. 12. For example, the customer may select shoes in FIG. 10, and then, as shown on FIG. 11, recommended shoes may be displayed as icons for selection by the customer. As shown in FIG. 12, after selecting the recommended AIRMAX shoe, a map showing merchants carrying the product is provided. A customer may click on one of the merchants to find out more about the product, receive a contextual offer from the merchant for the product and purchase the product.

Figure 13:
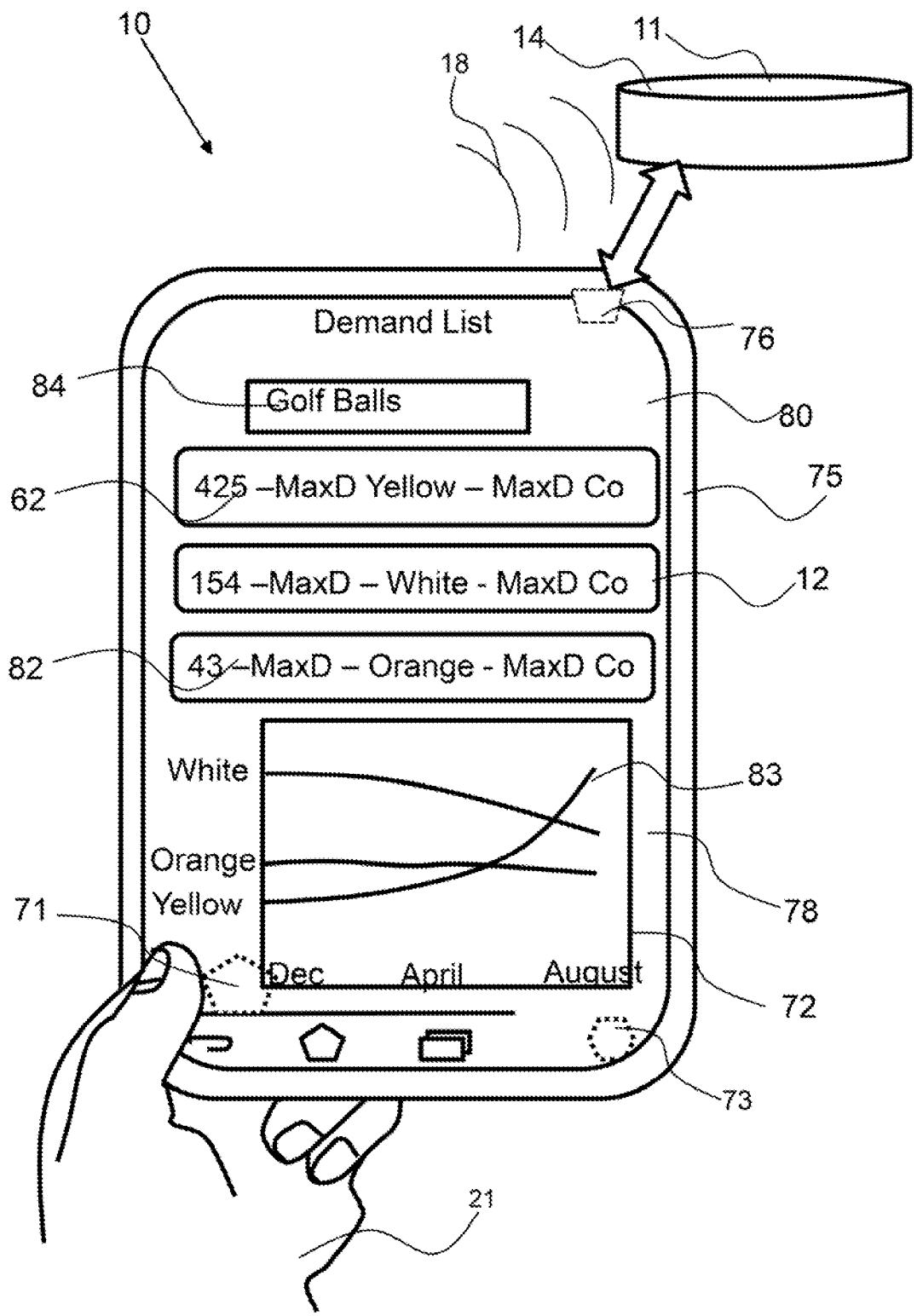
FIG. 13 shows a diagram of an exemplary demand list of products that is being viewed by a vendor.

As shown in FIG. 13, an exemplary demand list of products 82 is being viewed by a merchant associate 21 on a merchant interface 80, a computer 75. The merchant did a search using the merchant input 84 for "GOLF BALLS" and the database 14 retrieved a summarized list demand list of products 82 matching the search input. The demand list shows that there are a lot more "MaxD Yellow" golf balls from "MaxD Co." than the white or orange balls. The merchant may click to see a graphical history of the demand list of products and this graphical display of the demand list of products 83 may help the merchant predict inventory. As shown in the graphical display of the demand list of products, the yellow balls are becoming more popular than the white. This is a very powerful tool to help local merchants provide value and service to local customers and to encourage them to shop locally as the product availability and pricing may be favorable.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A geographical merchant consortium commerce system comprising:
   a) a plurality of merchants operating a business to provide a product to a customer;
   b) an operating system wherein each of said plurality of merchants subscribes to said operating system, said operating system comprising:
      i) a user interface to the operating system;
      ii) a database;
      iii) a customer subscription feature;
   wherein customers subscribe to said operating system through the customer subscription feature to become a subscribed customer;
   wherein subscribed customers provide customer contextual data to the operating system;
   wherein the contextual data includes event contextual data;
   wherein the operating system further comprises utilizing geolocation to identify when a subscribed consumer is within a proximity distance of a geographical region, and delivering a combined contextual offer from two or more of the plurality of merchants when said subscribed consumer moves within said proximity distance of the geographical region; and
   wherein the combined contextual offer includes a smart need product recommended from said event contextual data.

2. The geographical merchant consortium commerce system of claim 1, wherein the plurality of merchants operate a business within the geographical region.

3. The geographical merchant consortium commerce system of claim 2, wherein the plurality of merchants operate said business from a physical store within the geographical region.

4. The geographical merchant consortium commerce system of claim 2, wherein the geographical region is defined by a smallest area encompassing at least one physical store of each of said plurality of merchants.

5. The geographical merchant consortium commerce system of claim 2, wherein the geographical region is within a single zip code.

6. The geographical merchant consortium commerce system of claim 2, wherein the geographical region is within a single town.

7. The geographical merchant consortium commerce system of claim 2, wherein the geographical region is within a one mile radius.

8. The geographical merchant consortium commerce system of claim 2, wherein the geographical region is within a single structure.

9. The geographical merchant consortium commerce system of claim 2, wherein the geographical region is defined and set within the operating system by the plurality of merchants.

10. The geographical merchant consortium commerce system of claim 2, wherein the geographical region is defined and set within the operating system by the customer.

11. The geographical merchant consortium commerce system of claim 2, wherein the geographical region is a derived and set by the operating system by an area encompassing at least a portion of the plurality of merchants.

12. The geographical merchant consortium commerce system of claim 1, wherein the contextual data includes demographic data and wherein the contextual offer is a demographic contextual offer having at least one product determined by the contextual data input by said subscribed customer.

13. The geographical merchant consortium commerce system of claim 1, wherein the smart need product is a product determined by the operating system through analysis of the customer's internet activity.

14. The geographical merchant consortium commerce system of claim 1, wherein the operating system includes an interests input for a subscribed customer to input one or more interests, and wherein the contextual offer is an interest contextual offer having at least one product determined by the interest input.

15. The geographical merchant consortium commerce system of claim 1, wherein the contextual offer is an event contextual offer.

16. The geographical merchant consortium commerce system of claim 1, wherein the contextual offer is delivered to a mobile device of the subscribed customer automatically when said subscribed customer moves within said proximity distance.

17. The geographical merchant consortium commerce system of claim 1, wherein the operating system provides notice to one of said plurality of merchants when said subscribed customer moves within said proximity distance and wherein said proximity contextual offer is manually initiated by said merchant.

18. The geographical merchant consortium commerce system of claim 1, wherein the operating system includes a shopping list input for a subscribed customer to input a customer shopping list for one or more shopping list products, and wherein the contextual offer is a shopping list contextual offer having at least one shopping list product from said customer's shopping list.

19. The geographical merchant consortium commerce system of claim 18, wherein the customer selects which merchants of the plurality of merchants to have access to view said customer shopping list, wherein non-selected merchants can not view the customer shopping list.

20. The geographical merchant consortium commerce system of claim 18, wherein a demand list of products is produced from a plurality of customers shopping lists that is accessible by the plurality of merchants.

21. The geographical merchant consortium commerce system of claim 18, wherein the shopping list contextual offer is a combined shopping list contextual offer including two or more of said shopping list products from two or more of the plurality of merchants.

22. The geographical merchant consortium commerce system of claim 21, wherein the combined shopping list contextual offer includes a map showing the location of the two or more of the plurality of merchants providing the two or more of said desired products.

23. The geographical merchant consortium commerce system of claim 18, wherein the merchant consortium operating system utilizes geolocating to identify when a subscribed customer is within a proximity distance of said geographical region and wherein a proximity shopping list contextual offer is delivered to said subscribed customer by a merchant when they are within said proximity distance.

24. The geographical merchant consortium commerce system of claim 23, wherein the proximity shopping list contextual offer includes a map showing the location of the said merchant providing the shopping list product.

25. The geographical merchant consortium commerce system of claim 1, wherein the contextual offer includes a map showing the location of the two or more of the plurality of merchants providing the two or more of said desired products.

26. The geographical merchant consortium commerce system of claim 1, further comprising a customer search region that indicates to a merchant, customers that are within said customer search region.

27. The geographical merchant consortium commerce system of claim 26, wherein the customer search region is adjustable by at least one of said plurality of merchants.

28. The geographical merchant consortium commerce system of claim 26, wherein customers having matching products, shopping list or smart need products that correspond with products offered by said at least one of said plurality of merchants, are indicated as likely customers.

29. The geographical merchant consortium commerce system of claim 28, wherein matching products of the likely customer are identified to said at least one of said plurality of merchants.

30. The geographical merchant consortium commerce system of claim 29, wherein a likely customer contextual offer is sent to said likely customer by said at least one of said plurality of merchants for a matching product.

31. The geographical merchant consortium commerce system of claim 1, comprising a smart interface that provides predictive inputs based on smart needs for said customer.

32. The geographical merchant consortium commerce system of claim 1, further comprising a customer and merchant loyalty program that allocates points based on transactions through the geographical merchant consortium commerce system, wherein a combined contextual offer is awarded more points than contextual offer from a single merchant.

33. The geographical merchant consortium commerce system of claim 1, further comprising a customer and merchant loyalty program that allocates points based on transactions through the geographical merchant consortium commerce system, wherein the points are variable, wherein a first customer that has reached a highest level status based on points is awarded more points for a contextual offer than a second customer of a lower level status than said first customer.

34. The geographical merchant consortium commerce system of claim 1, further comprising a customer and merchant loyalty program that allocates points to the customers and merchants based on transactions through the geographical merchant consortium commerce system;
   wherein customers achieve a customer level status based on allocated points and wherein merchants achieve a merchant level status based on allocated points; and
   wherein a transaction between a first customer and a first merchant at a higher level status than a second customer and second merchant, respectively, is awarded more points than a transaction between the second customer and second merchant.

35. The geographical merchant consortium commerce system of claim 1, further comprising a customer and merchant loyalty program that allocates points based on transactions through the geographical merchant consortium commerce system, wherein a customer that has reached a highest level status based on points is awarded greater discounted offer than a customer of a lower levels status.

* * * * *